United States Patent Office 3,526,897
Patented Sept. 1, 1970

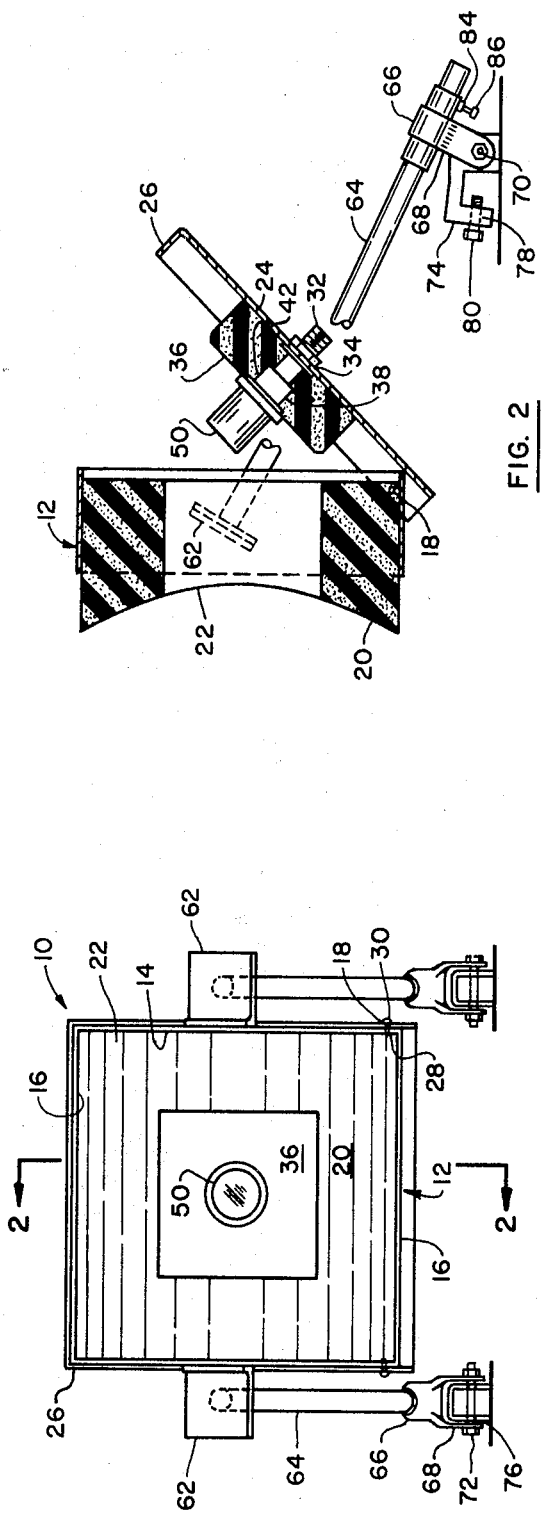

3,526,897
PARASITIC PROBE ANTENNA
Herbert E. Cribb, Satellite Beach, Fla., assignor to the United States of America as represented by the Administrator of the National Aeronautics and Space Administration
Filed Oct. 20, 1967, Ser. No. 677,505
Int. Cl. G01r; H01q 13/00, 1/42
U.S. Cl. 343—703                                  5 Claims

ABSTRACT OF THE DISCLOSURE

This invention relates to a parasitic probe having low insertion losses and requiring less power to be used by interrogating radar. A housing interiorly lined with RF absorbent material is adapted for mounting adjacent the spacecraft antenna. A spacecraft type helix antenna is mounted on the pivotal back plate of the housing with a conventional RF fitting to permit connection to external antennas. A polystyrene rod is affixed to the face of the helix antenna to establish a low loss path for electromagnetic waves flowing from the spacecraft antenna to the helix antenna. The housing construction and its location for operation provide a protective cover for the spacecraft antenna with the RF absorbent lining preventing stray radiation from reaching the interrogating radar.

---

The invention described herein was made by an employee of the United States Government and may be manufactured and used by or for the Government for governmental purposes without payment of any royalties thereon or therefor.

This invention relates generally to a parasitic probe antenna and more particularly to a low loss "C" band parasitic probe antenna.

Prelaunch test procedures for spacecraft and boosters necessarily require that all systems and equipment be completely tested for operational reliability prior to launch of the vehicle. In order to insure complete testing, the spacecraft must be isolated and the antennas thereof energized for transmission of radio frequency (RF, hereinafter) energy from the spacecraft or booster. Previously utilized devices for monitoring the signal transmitted from the spacecraft antenna generally were of a hat arrangement. These devices provided a marginal signal to the interrogating radar and the monitoring facilities. Moreover, the previous devices had high insertion losses and the spacecraft beacon reply was weak and marginal. Thus requiring the interrogating radar to use higher power to interrogate the spacecraft beacons.

In order to overcome the disadvantages of the prior art, the instant invention contemplates a housing lined on the interior with an RF absorbent material. A spacecraft type helix antenna is mounted centrally of the back of the housing and is connected with a conventional RF connector for attachment to a cable leading to external antennas. A polystyrene rod is mounted over the helix antenna and directed toward the spacecraft antenna to establish a low loss path for the electromagnetic waves to reduce insertion losses and provide a protective cover for the spacecraft antenna.

Accordingly, it is an object of the instant invention to provide a device for efficiently coupling RF energy from a spacecraft on the launch pad to outside antennas for prelaunch testing.

Another object of this invention is to provide a parasitic probe for prelaunch testing and protection of spacecraft antennas.

Still another object of the instant invention is to provide a housing lined with RF absorbent material and having a rod attached to the face of a spacecraft type helix antenna mounted in the housing and having a connector for a cable leading to external antennas.

A still further object of this invention is to provide a low loss "C" band parasitic probe having a housing interiorly lined with RF absorbent material and having a pivotal back plate with a cavity in the lining thereon for receiving a spacecraft type helix antenna to the face of which a polystyrene rod is attached to establish a low loss path for electromagnetic waves.

A more complete appreciation of the invention and many of the attendant advantages thereof will be readily apparent as the same becomes better understood by reference to the following description when considered in connection with the accompanying drawings wherein:

FIG. 1 is a front elevational view of the instant invention;

FIG. 2 is a sectional view taken on line 2—2 of FIG. 1 with a portion of the invention in an alternative position; and FIG. 3 is an enlarged sectional view of a portion of the instant invention.

Referring now to the drawings, and more particularly to FIGS. 1 and 2, wherein the instant inventive parasitic probe generally designated by numeral 10 is shown to include a rectangular frame or housing 12 having sides 14 and top and bottom 16. Sides 14 have apertures 18 located in a spaced relationship to the rearward bottom corner for a purpose to be more fully understood hereinafter.

The interior of housing 12 is covered with lining 20 of an RF absorbent material such as Eccosorb, AN-77, produced by Emerson-Cumming Company, which is a lightweight, flexible foam sheet, broadband microwave absorber. Lining 20 is adhesively secured to the inner sides of housing 12 and extends outwardly beyond the front edges of top and bottom 16 and has vertically arcuate sides 22 which assist in preventing stray radiation from the spacecraft antenna, not shown, as well as forming a protective cover for the spacecraft antenna.

Back plate 24 has flange 26 extending from the top and sides and is dimensioned to fit around the respective portions of housing 12. Apertures 28 are located in the lower portion of the sides of flange 26. Pivot bolt 30 extends through apertures 18 and 28 to pivotally secure back plate 24 to sides 14 of housing 12.

Aperture 34 is substantially centrally located in back plate 24 for attachment of conventional RF fitting 32 to permit a cable, not shown, leading to external antennas to be easily connected to parasitic probe 10. Lining section 36 also is made of RF absorbent material and is substantially rectangular to fit within lining 20 when back plate 24 is in the closed position. Cavity 38 extends through the center of lining section 36 to receive cup member 42. Spacecraft type helix antenna 40 is mounted in cup member 42 and is connected to RF fitting 32 to provide a path for the electromagnetic waves. Cover 44 extends beyond the sides of cup member 42 and has polystyrene center 46 inserted therein over helix antenna 40.

Polystyrene rod 50 has an attachment flange 52 extending outwardly therefrom at one end. Flange 52 is of greater diameter than center 46 and is secured to cover 44 by bolts or screws 54 and a conventional polystyrene adhesive. Rod 50 acts as an end-fire antenna and a guide for electromagnetic waves emitted from the spacecraft antenna, not shown. Since rod 50 is secured against center 46, there is a low loss path for the "C" band RF energy from the spacecraft antenna through rod 50 and center 46 to helix antenna 40, and, therefore, to RF fitting 32. Such an arrangement insures low insertion losses and the attendant advantages thereof.

Parasitic probe 10 is preferably constructed to be mounted on the gantry or framework surrounding the spacecraft. In order to accomplish such a mounting, brackets 62 are affixed to the exterior of sides 14 of housing 12 and may be angularly disposed if necessary for proper location of probe 10. Arms 64 are rigidly attached at one end to brackets 62 and extend rearwardly and downwardly from housing 12. Tubular brackets 66 fit over the other end of arms 64 and have flanges 68 extending downwardly to receive U-shaped clamp member 74. Flanges 68 have horizontal apertures 70 for receiving bolts 72 that pivotally mount clamp member 74 between flanges 68. Clamp member 74 is shaped to fit over a flange or other support, not shown, on the gantry structure and has aperture 76 in one leg to permit insertion of bolts 72. Threaded bore 78 extends through the other leg of clamp member 74 perpedicular to aperture 76 and receives set screw 80 for securing clamp member 74, and thus tubular bracket 66, on the gantry structure.

It is to be understood that tubular bracket 66 may be provided with boss 84 having threaded bore (not shown) for receiving set screw 86 to permit secure attachment of tubular brackets 66 on arms 64.

The above description of the instant invention indicates the advantages of this device in permitting the interrogating radar to use less signal which reduces the ground clutter and strengthens the reply from the spacecraft beacon. The RF absorbent material provides low insertion losses, as well as a protective cover for the spacecraft antenna which requires no physical attachment of the parasitic probe to the spacecraft.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. A parasitic probe for receiving a signal from a spacecraft antenna comprising:
    (A) a substantially rectangular frame having a top, bottom and sides;
    (B) a back plate pivotally mounted on said sides;
    (C) antenna means secured to said back plate;
    (D) connector means attached to said antenna means for connecting said antenna means with external antennas;
    (E) lining means on said rectangular frame; and
    (F) rod means disposed between said antenna means and said spacecraft antenna, whereby said spacecraft antenna is protected and stray radiation is prevented from reaching said spacecraft antenna to provide a very low loss RF coupling from said spacecraft antenna to said external antennas.

2. The parasitic probe of claim 1 wherein:
    (A) said antenna means comprises a spacecraft type helix antenna enclosed in a cup member; and
    (B) said cup member having a cover with a polystyrene center.

3. The parasitic probe of claim 1 wherein:
    (A) said lining means is made of an RF absorbent material;
    (B) said absorbent material covers the interior of said rectangular frame; and
    (C) a section of said absorbent material is mounted on said back plate and has a cavity therein for receiving and surrounding said antenna means.

4. The parasitic probe of claim 1 wherein:
    (A) an adjustable mounting support is attached to said back plate; and
    (B) said back plate is adapted to be pivoted from a position closing the back of said rectangular frame to an open position to provide access to the side of said back plate facing the interior of said rectangular frame.

5. The parasitic probe of claim 2 wherein:
    (A) said cover extends outwardly beyond the edge of said cup member to form a flange;
    (B) said rod means being a substantially cylindrical polystyrene dowel forming an end-fire antenna; and
    (C) said dowel having an outwardly extending flange on one end for attachment to said flange on said cover.

References Cited

UNITED STATES PATENTS

| | | | |
|---|---|---|---|
| 2,629,052 | 2/1953 | Iams | 343—785 X |
| 2,988,740 | 6/1961 | Albanese | 343—703 |
| 3,296,620 | 1/1967 | Rodda | 343—895 X |

HERMAN KARL SAALBACH, Primary Examiner

T. J. VEZEAU, Assistant Examiner

U.S. Cl. X.R.

343—705, 785, 833, 851, 872, 895